(12) United States Patent
Streng et al.

(10) Patent No.: US 9,022,753 B2
(45) Date of Patent: May 5, 2015

(54) VENTILATOR

(75) Inventors: Gunter Streng, Schrozberg (DE);
Walter Hofmann, Mulfingen (DE)

(73) Assignee: EBM-Papst Mulfingen GmbH & Co. KG (DE)

( * ) Notice: Subject to any disclaimer, the term of this patent is extended or adjusted under 35 U.S.C. 154(b) by 671 days.

(21) Appl. No.: 13/050,263

(22) Filed: Mar. 17, 2011

(65) Prior Publication Data

US 2011/0229358 A1  Sep. 22, 2011

(30) Foreign Application Priority Data

Mar. 22, 2010 (DE) .............................. 102010012392

(51) Int. Cl.
| | | |
|---|---|---|
| F04D 25/08 | (2006.01) | |
| H02K 1/32 | (2006.01) | |
| H02K 9/04 | (2006.01) | |
| H02K 21/22 | (2006.01) | |
| H02K 7/14 | (2006.01) | |
| H02K 11/00 | (2006.01) | |

(52) U.S. Cl.
CPC ............... F04D 25/082 (2013.01); H02K 1/32 (2013.01); H02K 9/04 (2013.01); H02K 21/22 (2013.01); H02K 7/14 (2013.01); H02K 11/0073 (2013.01); H02K 2213/03 (2013.01)

(58) Field of Classification Search
CPC ............................. F04D 25/08; F04D 25/082
USPC .............. 417/423.14, 352–354, 366
See application file for complete search history.

(56) References Cited

U.S. PATENT DOCUMENTS

| | | | |
|---|---|---|---|
| 3,726,611 A | * | 4/1973 | Astrom .......................... 417/362 |
| 4,612,468 A | * | 9/1986 | Sturm et al. ................. 310/67 R |
| 7,345,386 B2 | | 3/2008 | Dano et al. |
| 7,616,440 B2 | | 11/2009 | Franz |
| 2005/0233688 A1 | * | 10/2005 | Franz ............................ 454/157 |
| 2009/0196744 A1 | | 8/2009 | Yu |

FOREIGN PATENT DOCUMENTS

| | | |
|---|---|---|
| DE | 2257509 | 11/1972 |
| DE | 69824126 T2 | 9/2004 |
| DE | 10 2005 006192 A1 | 3/2006 |

(Continued)

OTHER PUBLICATIONS

International Search Report.

(Continued)

Primary Examiner — Charles Freay
Assistant Examiner — Philip Stimpert
(74) Attorney, Agent, or Firm — Brinks, Gilson & Lione (57) ABSTRACT

A fan (1) consisting of an electric external rotor motor (2) and of a fan wheel (4), the external rotor motor (2) consisting of a stator (6) encapsulated with an insulating material (14), and a rotor (8) carrying the fan wheel (4) enclosing the stator (6) in a pot-shaped manner. The rotor (8) having ventilation openings in a front wall (18). The stator (6) having projecting fins (24) on a front area (22) arranged and distributed over the circumference which is opposite the ventilation openings (20). A gap (34) between a circumferential rim (36) of the rotor (18) opposite the front wall (18) and a stator carrier (38) forms a passage for a cooling air current flowing around the stator (6) during operation. During operation, the cooling air is swirled intensively between the ventilation openings (20) and the projecting fins (24) for cooling the motor.

16 Claims, 7 Drawing Sheets

(56) References Cited

FOREIGN PATENT DOCUMENTS

| DE | 20 2006 018 454 U1 | 5/2007 |
| DE | 10 2006 006702 A1 | 8/2007 |
| EP | 1404008 A2 | 3/2004 |
| EP | 2 068 003 A2 | 9/2008 |
| EP | 2061134 A1 * | 5/2009 |
| WO | WO 2008/146154 A2 | 12/2008 |

OTHER PUBLICATIONS

International Search Report—Jul. 4, 2011.

* cited by examiner

VENTILATOR

CROSS REFERENCE TO RELATED APPLICATIONS

This application claims priority to German Patent Application Number 10 2010 012 392.7, filed Mar. 22, 2010.

FIELD OF THE INVENTION

The present invention relates to a ventilator in the form of a fan consisting of an electric external rotor motor and a fan wheel, the external rotor motor consisting of a stator encapsulated with an insulating material and of a rotor (external rotor) carrying the fan wheel enclosing the stator in a pot-shaped manner.

BACKGROUND OF THE INVENTION

A fan of the above-referenced type is known from document EP 1 404 008 A2, in which an electric motor with an external rotor is described which carries a fan wheel on its outer circumference. The stator has a stator insulation structure made of Duroplast, whereby a laminated stator core provided with stator windings is coated and simultaneously molded with the insulating material. As the rotor likewise encloses the stator, the heat in the region of the stator can considerably increase during operation.

The underlying problem of the present invention is to improve a fan of the above mentioned type such that effective cooling of the motor as well as favorable flow properties are ensured.

According to the present invention it is thus provided that, on the one hand, the rotor has ventilation openings in a front wall for a cooling air flow, and, on the other hand, it has projecting fins on a front wall axially opposite the ventilation openings which are arranged and distributed over the circumference, wherein a gap forms a passage between a circumferential rim of the rotor opposite the front wall and a flange-like stator carrier for the cooling air current flowing around the stator during operation. In this way, the ventilation opening of the rotor, on the one hand, and the passage between the circumferential rim of the rotor and the stator carrier, on the other hand, enable the flow of cooling air through the motor, whereby the cooling air flows around the stator through a circumferential gap located between it and the rotor. The flow direction depends on the design of the fan as well as, in particular, on which axial side a negative and/or positive pressure develops each time during operation. If, for example, negative pressure develops in the region of an axial suction opening in the case of a radial or diagonal fan, and if the rotor is facing the suction opening of the fan wheel with the front wall and the ventilation openings, cooling air is suctioned from the opposite side due to the negative pressure, i.e. the cooling air flows in through the passage at the circumferential rim of the rotor, flows around the stator and again flows out through the ventilation openings of the front wall. In the case of an axial fan, the flow direction of the cooling air depends on the actual conveying direction of the fan wheel, which in fact always flows in the opposite direction to the conveying direction.

The ventilation openings of the rotor and the projecting fins of the stator are in this case configured and arranged relative to one another such that during operation the motor cooling air is swirled in the region between the projecting fins of the stator and the ventilation openings of the rotor by means of a kind of "swirling effect." The interaction between the ventilation openings of the rotor and the projecting fins of the stator preferably molded from the insulating material is especially important for the achieved heat dissipation (cooling) of the motor. In this way, the suctioned air, and therefore cooling air, flowing into the motor as a result of the negative pressure existing on one side of the fan during operation is swirled between the ventilation openings and the projecting fins— virtually according to the swirl principle, which, associated with the stator surface area which is enlarged by the projecting fins and acts as a convection surface, results in a very effective heat absorption (convection), i.e. the cooling air absorbs the motor heat and thus cools the motor and/or the stator. The cooling air also flows around the stator through the circumferential gap existing between the rotor and the stator and thereby further cools the stator.

Despite the cooling air current according to the present invention, the fan is also suitable for use in damp areas (for example for refrigeration and air-conditioning applications) because the encapsulated, i.e. pressed or overmolded, stator ensures a high IP degree of protection according to DIN EN 60529 and DIN 40050, Section 9.

In a further advantageous arrangement, the ventilation openings with a definite number of openings as well as the projecting fins with a definite number of fins are in particular arranged and distributed over the circumference in a radial symmetric manner. The number of openings and the number of fins should in any case be unequal and preferably also mutually prime. These unequal and preferably also mutually prime number of ventilation openings on the one hand, and of the projecting fins on the other hand, result in favorable, i.e. low, operating noise, in particular by avoiding the occurrence of resonance and/or rotational noise. In concrete terms, there are at least two—but preferably, however, a greater number of ventilation openings. Seven ventilation openings and six projecting fins are, for example, provided in an advantageous described embodiment. In that case, on account of their size, the ventilation openings jointly define an effective opening cross-section, whose relationship to the total, axially projected cross-sectional area of the rotor is between 10% and 30%.

It is further advantageous if each of the ventilation openings has a circumferential, nozzle-like opening rim that projects in the direction of the stator and with a maximum distance of about 4 mm extends out to the proximity of the projecting fins. These protruding opening rims still reinforce the "swirl effect" according to the present invention by interacting as "opposites" with the projecting fins; the cooling air is consequently swirled on both axially opposite sides between fins rotating relative to one another.

According to another aspect of the invention, in order to improve the flow properties, and namely, especially, for an arrangement as a radial fan, the invention provides that in the radial outer region of its front wall the rotor is converted into a cylindrical circumferential wall via a chamfered wall section, whereby the chamfered wall section and the longitudinal axis of the motor comprise a chamfer angle of 30° to 60°, preferably 50°. It is further advantageous if the front wall having the ventilation openings of the rotor is slightly tilted conically at a cone angle relative to the longitudinal axis, the cone angle being in the range of 60° to 80°, preferably 70°. By means of this particular feature it is possible that, in the case of a radial fan, even with a short axial dimension, i.e. a compact size, an enlarged inlet cross-section is formed in the region between an axial air inlet of the radial fan, the fan wheel configured as a radial wheel, and the rotor. This will be explained hereafter in more detail with reference to the drawings.

BRIEF DESCRIPTION OF THE DRAWINGS

In addition, other special features of the embodiment and achieved advantages will also be explained hereafter. For this purpose, the invention will be described in more detail by way of example with reference to the drawings and the preferred embodiments shown therein. The drawings show:

FIG. 5 is a perspective exploded view of the main components of the external rotor motor according to FIGS. 3 and 4, namely

DETAILED DESCRIPTION OF THE INVENTION

Identical parts are always provided with the same reference numerals in the different figures of the drawing.

Figure 1:
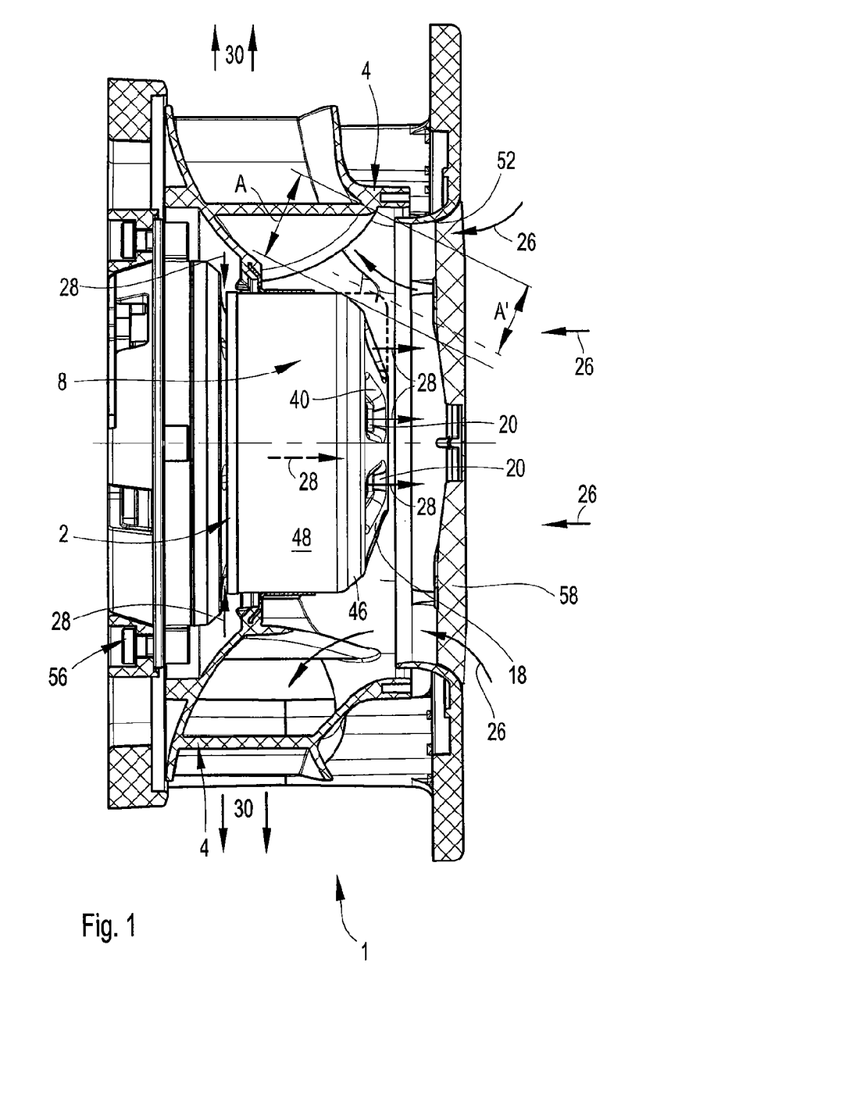
FIG. 1 shows a fan according to the present invention in a first embodiment as a radial, unilateral suction fan (radial blower) in a partial cross-sectional side view.
Figure 2:
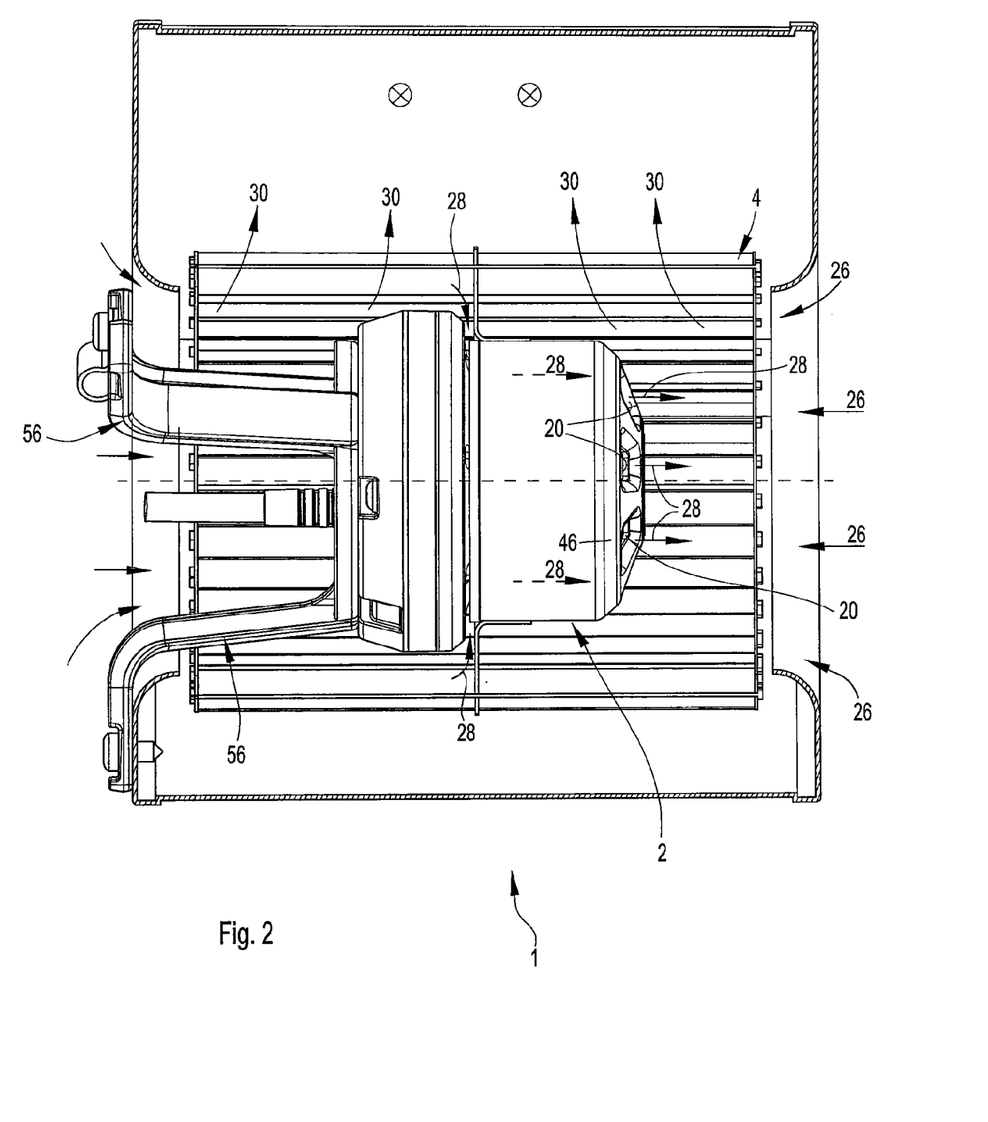
FIG. 2 is a view similar to FIG. 1 of a second embodiment of the fan as a radial, bilateral suction fan.
Figure 5A:
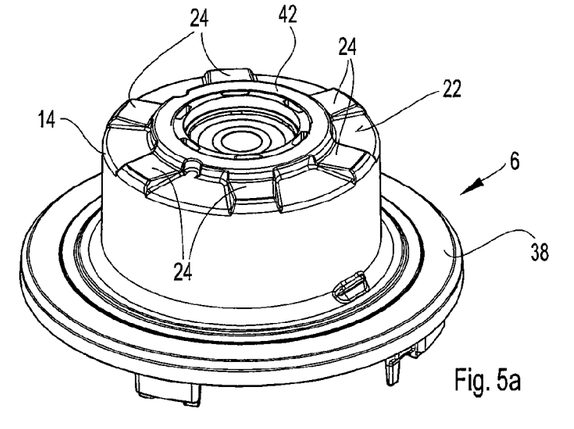
FIG. 5a shows the stator.

As is apparent in the first instance in each of FIGS. 1 and 2, a fan 1 according to the present invention consists of an electric external rotor motor 2 and a fan wheel 4. The external rotor motor 2 shown separately in the other FIGS. 3 to 8 in turn consists of a stator 6 (s. FIG. 5a in particular) and a rotor (external rotor) 8 (FIG. 5b) enclosing the stator in a pot-shaped manner from an axial side. As is especially apparent from FIGS. 5a, 6 and 8, the stator 6 including a laminated stator core 12 provided with stator windings 10 is molded and encapsulated with an insulating material 14. This can be carried out by pressing, in particular, however, by overmolding with a suitable plastic material, e.g. Duroplast, as a result of which the stator 6 according to FIG. 5a attains an overall cylindrical basic shape.

As is further apparent from FIGS. 1 and 2, the fan wheel 4 is mounted on the outer circumference of the rotor 8 so that the rotor 8 carries the fan wheel 4.

The electric external rotor motor 2 is preferably configured as a commutated, permanent magnet-excited DC motor, the rotor 8 having permanent magnets 16 on its inner circumference. For this purpose, reference is made in particular to the cross-sectional views in FIGS. 6 and 8. The stator 6 generates a magnetic field in a manner known per se, as a result of which the rotor rotates by interacting with the permanent magnets 16. In order to generate the magnetic field the windings 10 of the stator 6 are driven (commutated) by means of a control electronics system.

According to the present invention, it is provided, on the one hand, that the rotor 8 has ventilation openings 20 in a front wall 18. On the other hand, on a front wall 22 the stator 6 has projecting fins 24 arranged axially opposite the ventilation openings 20 of the rotor 8 which are distributed over the circumference. Reference is made in this regard to FIG. 5a as well as to FIG. 8. The projecting fins 24 are preferably integrally molded from the insulating material 14. When the fan 1 is operated, the rotor 8 thus rotates with the ventilation openings 20 relative to the stator 6 with the projecting fins 24. According to FIGS. 1 and 2, air is suctioned by the fan wheel 4 in the direction of the drawn arrows 26, the suctioned air being accelerated, as intended, by the fan wheel 4 and blown outward in the direction of the arrow 30. Induced by a developing negative pressure—in the example shown as a radial fan in the region before the front wall 18—a cooling air current also develops which is indicated by arrows 28.

Figure 8:
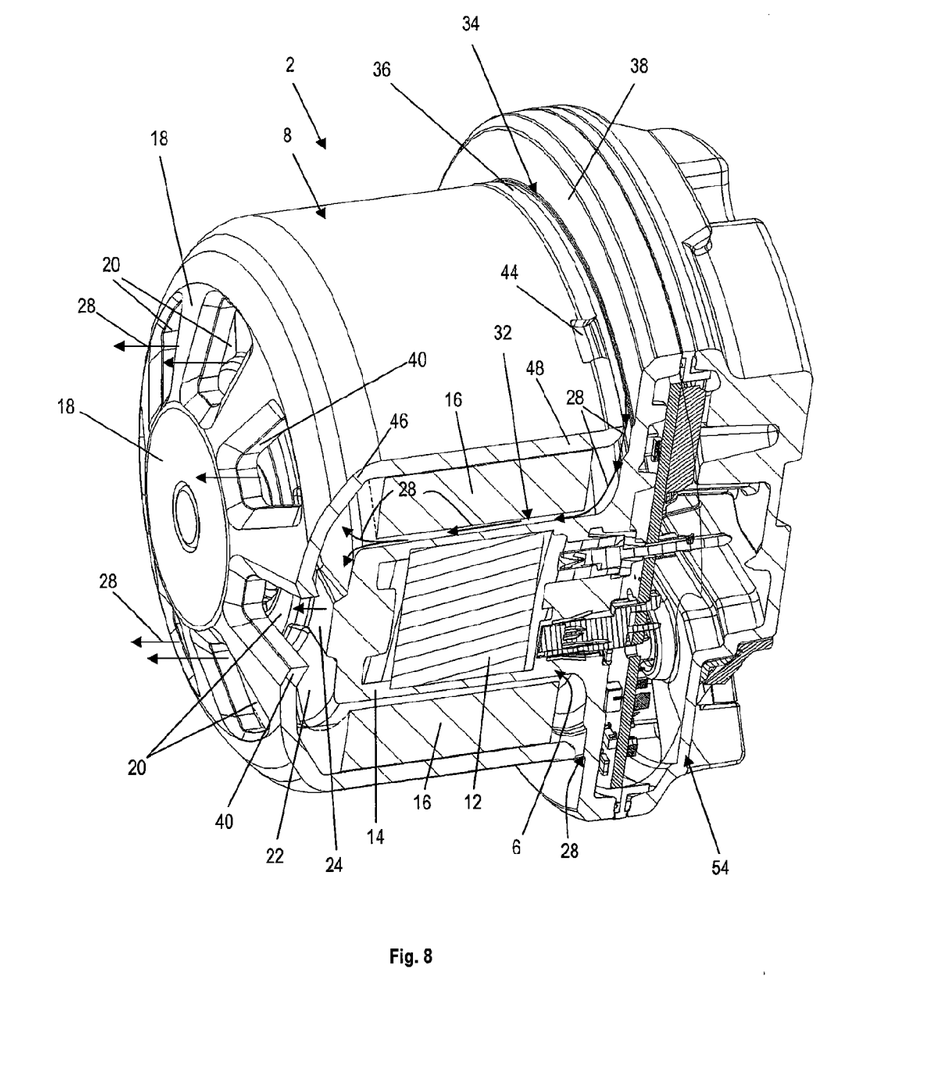

As is especially apparent from FIG. 8, the cooling air is intensively swirled in the region between the front wall 18 of the rotor and the front area 22 of the stator by the interaction between the ventilation openings 20 and the projecting fins 24, as a result of which the cooling air effectively absorbs heat from the stator 6. The cooling air flows e.g. according to the direction of the arrow 28, through a circumferential gap 32 between the stator 6 and the rotor 8, flowing in radially from the outside via a gap 34 between a circumferential rim of the rotor 8 and a stator carrier 38, and again flowing out through the ventilation openings 20. This flow of the cooling air is shown in FIG. 8 by arrows. It should, however, be noted in this respect that, depending in the embodiment of the fan, an inverse flow direction of the cooling air is also possible.

The ventilation openings 20 are conveniently arranged and distributed over the circumference with a definite number x of openings in a radial symmetric manner, whereby at least two ventilation openings 20 are provided ($x \geq 2$). Accordingly, the projecting fins 24 are also preferably arranged and distributed over the circumference with a definite number y in a radial symmetric manner. It is advantageous in this case, if the numbers x, y of the ventilation openings 20 and of the projecting fins 24 are in any case unequal and in particular also mathematically mutually coprime. Thus, $x \neq y$ and preferably $x \perp y$ will apply. A favorable noise behavior is achieved with this arrangement. Seven ventilation openings 20 ($x=7$) and six projecting fins 24 ($y=6$) are provided in the shown preferred exemplary embodiment. The invention is, however, not limited hereto.

It is further advantageous if the ventilation openings 20 have a trapezoidal or circular sector-shape with rounded corners, as a result of which they become radially wider from the inside to the outside similar to cake slices. In this manner a good utilization of the available area is achieved, i.e. the overall available surface area in the region of the front area 22 (basically the axially projected transverse cross-sectional surface of the rotor 8) can largely be interrupted in a proportion of 10% to 30% by the ventilation openings 20.

In another advantageous arrangement, each ventilation opening 20 has a circumferential opening rim 40 which extends nozzle-like in the direction of the stator 6. These opening rims 40 extend at a maximum axial distance of about 4 mm to the proximity of the projecting fins 24. During operation, the ventilation openings 20 with their opening rims 40 thus rotate in the proximity of the projecting fins 24, as a result of which an effective air swirl is achieved.

With respect to the projecting fins 24 of the stator 6, they are preferably arranged radially star-shaped on the front area 22, as it is shown in FIG. 5a. The front area 22 is located in a plane vertical to the longitudinal axis of the motor (rotational axis of the rotor 8). A concentric, axially protruding annular rib edge 42 is formed in the inner radial region. Starting at this annular rib edge 42, the projecting fins 24 extend radially outward with reduced height at first and axially increasing height afterwards. The surfaces thus increase radially from the inside outwards. In an axial top view, the basic shape of the projecting fins 24 is approximately rectangular or is narrowed outward in a slightly trapezoidal manner. In the circumferential direction, the projecting fins 24 have flank sides which can be configured diagonally such that the projecting fins 24 are narrowed in the axial direction. In the interaction with the ventilation openings 20 and their opening rims 40, the shape of the projecting fins 24 influences the swirling cooling air flow entering through the ventilation openings 20 during operation. In addition, the projecting fins 24 enlarge the effective convection area of the stator 6.

Figure 3:
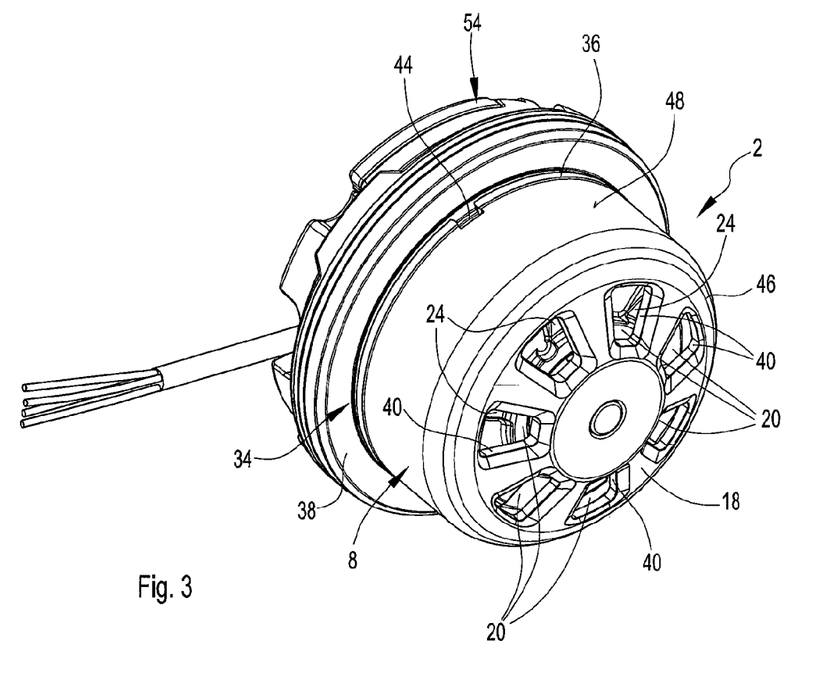
FIG. 3 is a separate perspective view of the front end of an external rotor motor (rotor side) according to the present invention.
Figure 4:
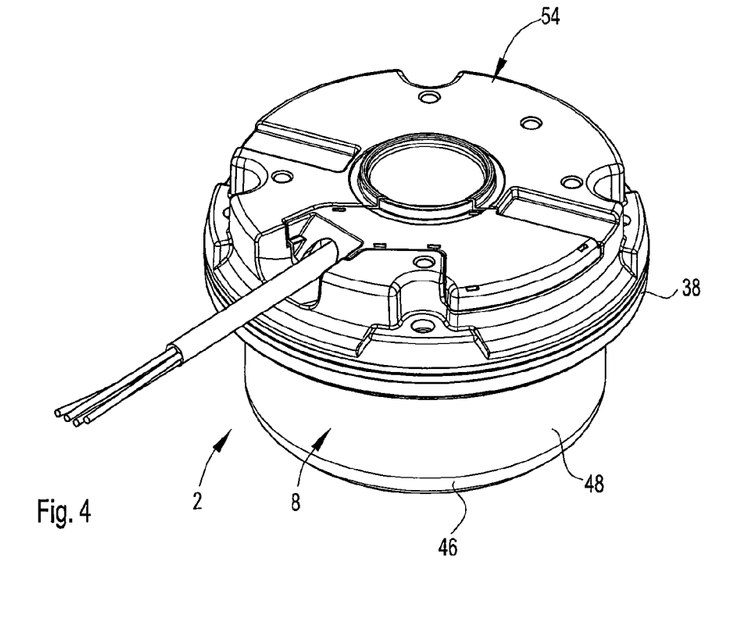
FIG. 4 is a perspective view of the rear end of the external rotor motor (stator and/or carrier side)
Figure 5B:
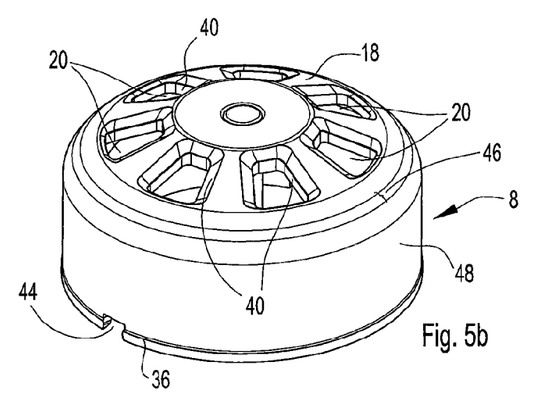
FIG. 5b shows the rotor.
Figure 5C:
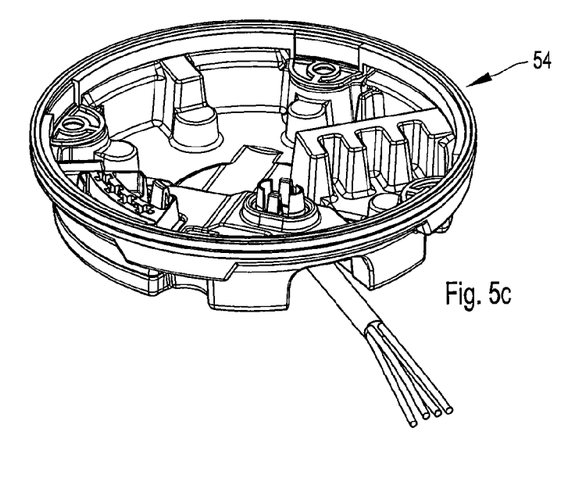
FIG. 5c shows an additional mounting and/or housing part.
Figure 6:
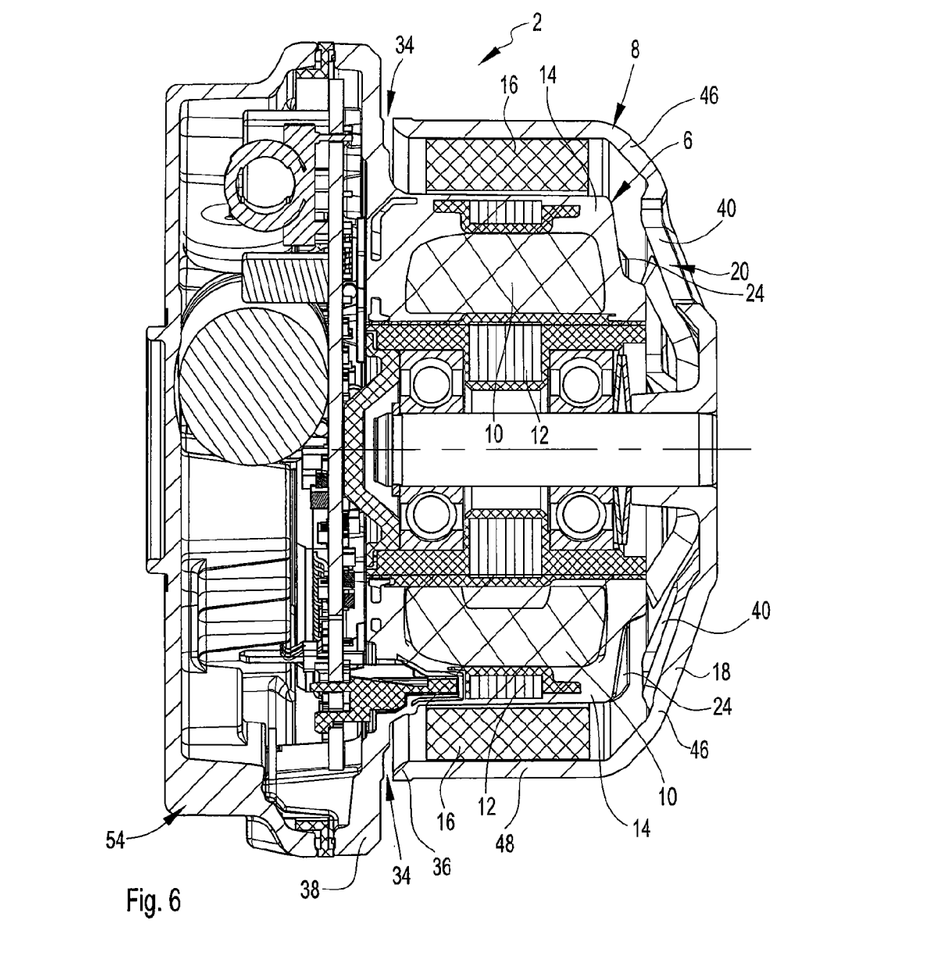
FIG. 6 is an enlarged axial cross-section through the external rotor motor according to FIGS. 3 to 5.
Figure 7A:
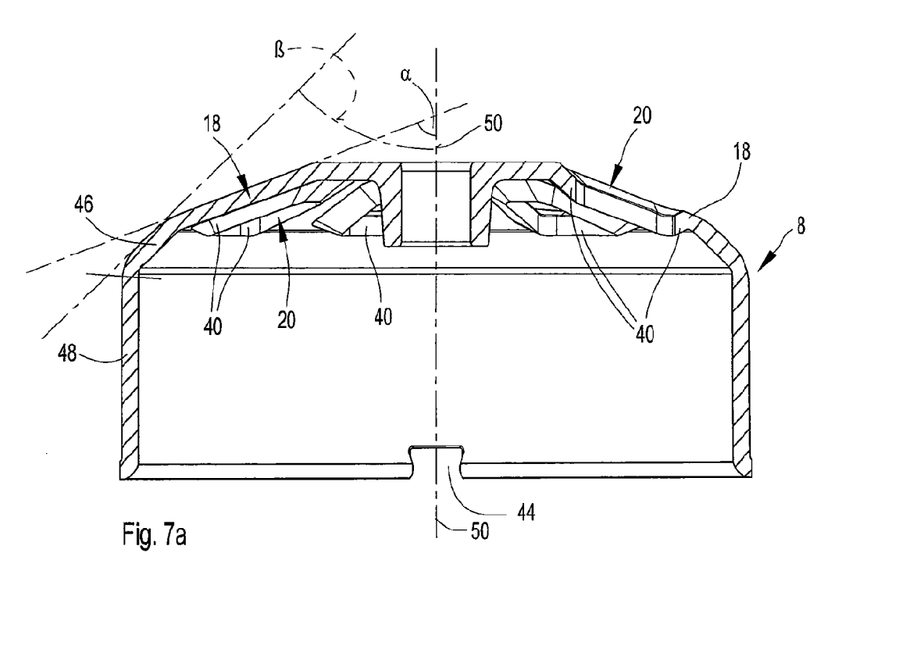
FIG. 7a is an axial cross-section of the rotor (without internal magnets)
Figure 7B:
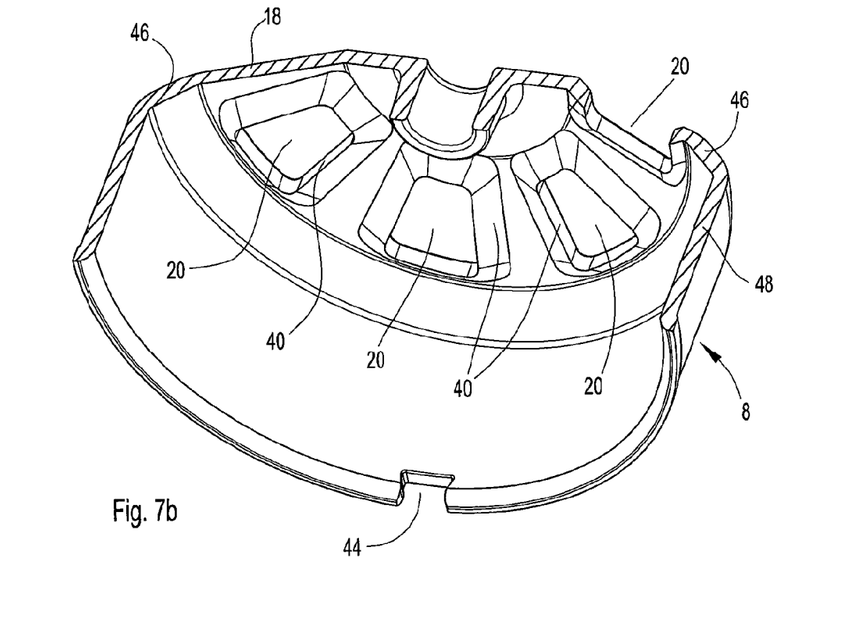
FIG. 7b is a cross-sectional view of the rotor according to FIG. 7a, and FIG. 8 is an enlarged and eccentrically longitudinal perspective view of the external rotor motor according to the present invention in order to explain the cooling air flow.

As is additionally apparent from FIGS. 3, 5b, 7a, b and 8, at least one recess 44 increasing the flow cross-section for the cooling air can be configured in the region of the circumferential rim 36 of the rotor 8.

Another aspect of the invention deals with an improved flow arrangement of the fan 1. In this regard the invention provides that in the radial outer region of its front wall 18, the rotor is converted into a cylindrical circumferential wall 48 via a chamfered wall section 46. According to FIG. 7a, the front wall 18 having the ventilation openings 20 of the rotor 8 is slightly tilted conically at a cone angle α relative to the longitudinal axis 50. The cone angle is preferably in the range of 60 to 80°, and in particular 70°. The chamfered wall section 46 connecting the face front wall 18 and the circumferential wall 48 preferably comprises a chamfer angle β in the range of 30° to 60° and in particular 50° with the longitudinal axis 50.

By means of this described advantageous arrangement, a kind of rounding in the outer front transition region between the front wall 18 and the circumferential wall 48 is virtually achieved, compared to a rotor in which the front wall is in a vertical plane to the longitudinal axis 50 and merges directly at a right angle into the circumferential wall 48. As shown in FIG. 1, an enlargement of the inlet cross-section is thereby achieved by forming a large clear space A between the rotor 8 and an inlet area 52 of the fan 1 arranged as a radial fan. In addition, FIG. 1 shows the relationship to a conventional fan in a dashed line, a smaller space A' being available.

According to FIG. 5a, another advantageous arrangement provides that the stator carrier 58 is configured as a flange-like, integrally molded section of the insulating material 14 encapsulating the stator 6. In addition, the flange-like stator carrier 38 together with an additional housing part 54 (s. the separate drawing in FIG. 5c) forms an electronics housing for an electronics control system, which is not described in detail, on the side facing away from the stator 6. The housing part 54 also functions as a carrier part of the entire external rotor motor 2, as it is mounted on or can be mounted in a fan housing by means of mounting parts 56 (cf. FIGS. 1 and 2).

It should finally also be mentioned that the invention is suitable for radial or diagonal fans as well as basically for axial fans. FIG. 1 shows an exemplary embodiment as a radial, unilateral suction fan, the fan wheel 4 being configured as a radial wheel with a front axial inlet (after the inlet area 52), several radial blades and a radial blow-out direction. The radial blades are arranged in the usual way between cover disks. The fan housing can optionally have a front protective grid 58 in the inlet area 52.

FIG. 2 shows an embodiment as a radial, bilateral suction fan, the fan wheel 4 being configured as a radial fan with two axially opposite inlets, several radial blades, and likewise a radial blow-out direction.

In both cases according to FIGS. 1 and 2, the radial blades can be configured bent backward, bent forward, or optionally also straight (radially).

The rotor 8 can be configured as a molded part made of metal or plastic. In an embodiment made of a soft magnetic metal the circumferential wall 48 also functions as a magnetic return element for the permanent magnets 16 arranged on the inside. If the rotor 8 in the main axis alternatively consists of plastic, a return element is additionally required in the inside.

The invention is not restricted to the shown and described exemplary embodiments, but also comprises all identically acting embodiments consistent with the invention. It is expressly stated that the exemplary embodiments are not limited to all combined features; on the contrary, each partial feature can also be inventively important by itself independently of all other partial features. Furthermore, the invention is not even restricted to the combination of features defined in the claims, but can also be defined by any other combination of definite features of all disclosed individual features.

The invention claimed is:

1. A fan (1) consisting of an electric external rotor motor (2) and of a fan wheel (4), the external rotor motor (2) consisting of a stator (6) encapsulated with an insulating material (14), and of a rotor (8) carrying the fan wheel (4) enclosing the stator (6) in a pot-shaped manner, comprising the rotor (8) having ventilation openings (20) in a front wall (18) and the stator (6) having projecting fins (24) on a front area (22) opposite the ventilation openings that are arranged and distributed circumferentially, wherein a gap (34) forms a passage between a circumferential rim (36) of the rotor (8) opposite the front wall (18) and a stator carrier (38) for the cooling air current flowing around the stator (6) during operation of the fan, wherein all the ventilation openings (20) have a total opening cross-section whose relationship to the total cross-sectional area of the rotor (8) is in the range of 10% to 30%.

2. The fan according to claim 1, wherein the ventilation openings (20) are provided in a definite number of the openings (x) as well as the projecting fins (24) being provided in a definite number of fins (y) are arranged and distributed over the circumference in a radial symmetric manner, the number of the openings (x) and the number of the fins (y) being unequal.

3. The fan according to claim 2, wherein the number of the openings (x) and the number of the fins (y) are mutually prime.

4. The fan according to claim 1, wherein the ventilation openings (20) have a trapezoidal shape.

5. The fan according to claim 1, wherein each of the ventilation openings (20) having a circumferential, nozzle-like opening rim (40) that protrudes in the direction of the stator (6) and with a maximum distance of about 4 mm extends out to the proximity of the projecting fins (4).

6. The fan according to claim 1, wherein the projecting fins (24) of the stator (6) are arranged radially.

7. The fan according to claim 1, wherein in the region of the circumferential rim (36) of the rotor (8) at least one recess (44) is formed that increases the flow cross-section area for the flowing of cooling air.

8. The fan according to claim 1, wherein the front wall (18) of the rotor (8) having ventilation openings (20) is slightly conically tilted relative to the longitudinal axis (50) of the fan at a cone angle (α), the cone angle (α) being in the range of 60° to 80°, or about 70°.

9. The fan according to claim 1, wherein in the radial outer region of the front wall (18) the rotor (8) is converted into a circumferential wall (48) via a chamfered wall section (46), whereby the chamfered wall section (46) comprises a chamfer angle (β) to the longitudinal axis (50) of the fan in the range of 30° to 60°, or about 50°.

10. The fan according to claim 1, wherein the stator carrier (38) is configured as a flange-like, integrally molded section of insulating material (14) encapsulating the stator (6).

11. The fan according to claim 1, wherein the stator carrier (38), together with an additional housing part (54), forms an electronics housing for an electronics control system on a side facing away from the stator (6).

12. The fan according claim 1, wherein the fan is in the form of a radial, unilateral suction fan, the fan wheel (4) being configured as a radial wheel with an axial front inlet, having several radial blades and providing a radial blow-out direction.

13. The fan according to claim 1, wherein the fan is in the form of a radial, bilateral suction fan, the fan wheel (4) being configured as a radial wheel with two axially opposite blades and a radial blow-out direction.

14. The fan according to claim 1, wherein the fan is in the form of an axial fan, the fan wheel (4) being configured as an axial wheel with several axial fan blades.

15. The fan according to claim 1, wherein the external rotor motor (2) is configured as a brushless, electronically commutated DC motor.

16. The fan according to claim 1, wherein the axial ventilation openings (20) guide a cooling air flow outward through the front wall.

* * * * *